(12) United States Patent
Meyles et al.

(10) Patent No.: US 11,669,301 B2
(45) Date of Patent: Jun. 6, 2023

(54) EFFECTIVELY FUSING DATABASE TABLES

(71) Applicant: AMPERITY, INC., Seattle, WA (US)

(72) Inventors: Stephen Meyles, Seattle, WA (US);
Yan Yan, Seattle, WA (US); Carlos Sakoda, Seattle, WA (US); Ian Wesley-Smith, Seattle, WA (US); Dan Suciu, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 20 days.

(21) Appl. No.: 17/104,868

(22) Filed: Nov. 25, 2020

(65) Prior Publication Data

US 2021/0081171 A1 Mar. 18, 2021

Related U.S. Application Data

(63) Continuation of application No. 15/729,931, filed on Oct. 11, 2017, now Pat. No. 10,853,033.

(51) Int. Cl.
| | |
|---|---|
| *G06F 7/02* | (2006.01) |
| *G06F 16/00* | (2019.01) |
| *G06F 7/14* | (2006.01) |
| *G06F 16/2455* | (2019.01) |
| *G06F 16/215* | (2019.01) |
| *G06F 16/23* | (2019.01) |
| *G06F 16/242* | (2019.01) |

(52) U.S. Cl.
CPC .............. *G06F 7/14* (2013.01); *G06F 16/215* (2019.01); *G06F 16/2365* (2019.01); *G06F 16/244* (2019.01); *G06F 16/24556* (2019.01)

(58) Field of Classification Search
CPC ...... G06F 16/215; G06F 16/24; G06F 16/244; G06F 16/2365; G06F 16/2393; G06F 16/00
See application file for complete search history.

(56) References Cited

U.S. PATENT DOCUMENTS

| | | |
|---|---|---|
| 7,039,656 B1 * | 5/2006 | Tsai ........................ G06F 21/31 |
| 7,899,796 B1 | 3/2011 | Borthwick et al. |
| 7,912,842 B1 | 3/2011 | Bayliss |
| 10,248,736 B1 * | 4/2019 | Carroll ................. G06F 16/957 |
| 2002/0188598 A1 | 12/2002 | Myllymaki |
| 2003/0126156 A1 | 7/2003 | Stoltenberg et al. |
| 2003/0177119 A1 * | 9/2003 | Cole ..................... G06F 16/273 |
| 2005/0108184 A1 | 5/2005 | Furusho |
| 2007/0276858 A1 | 11/2007 | Cushman et al. |
| 2009/0327851 A1 | 12/2009 | Raposo |
| 2014/0156606 A1 | 6/2014 | Beskales et al. |
| 2014/0330845 A1 | 11/2014 | Feldschuh |
| 2017/0235803 A1 | 8/2017 | Domoto et al. |
| 2018/0089235 A1 * | 3/2018 | Kabra .................. G06F 16/215 |

* cited by examiner

*Primary Examiner* — Bruce M Moser
(74) *Attorney, Agent, or Firm* — George David Zalepa; Greenberg Traurig, LLP

(57) ABSTRACT

The present disclosure relates to fuse multiple database tables together. The fields of the database tables may be normalized using semantic fields. Under a first approach, database tables are deduplicated by consolidating redundant records. This may be done by performing pairwise comparisons to identify related pairs of records and then clustering the related pairs of records. Then, the deduplicated database tables are merged by performing another pairwise comparison. Under a second approach, the database tables may be concatenated. Thereafter, records are subject to pairwise comparisons and then clustered to create a merged database table.

20 Claims, 10 Drawing Sheets

| Record Number | F1 First Name | F2 Last Name | F3 Area Code | F4 Zip Code | F5 SSN |
|---|---|---|---|---|---|
| A1 | Jane | Doe | 404 | | |
| A2 | Jane | Doe | 408 | | |
| A3 | Stephen | Meyles | | | |
| A4 | Carlos | Sakoda | 206 | | |
| A5 | Yan | Yan | 425 | | |
| B1 | Jonathan | Smith | | 98132 | |
| B2 | Carlos | Sakoda | | 98006 | 1989 |
| B3 | John | Smith | | 98132 | 3427 |
| B4 | Jane | Doe | | 30032 | 8831 |
| C1 | Derek | Slager | | | |
| C2 | Chuck | Sakoda | | | 1989 |
| C3 | Janet | Doe | | | 8831 |

FIG. 6

US 11,669,301 B2

EFFECTIVELY FUSING DATABASE TABLES

CROSS-REFERENCE TO RELATED APPLICATIONS

This application is a continuation of, and claims the benefit of priority, to U.S. application Ser. No. 15/729,931, filed on Oct. 11, 2017, which is hereby incorporated by reference in its entirety.

BACKGROUND

In the course of business, large amounts of data records are collected and stored in one or more databases. These data records may reflect customer information, business records, events, products, or other records pertinent to a relevant business. These records can accumulate from a number of data sources. For example, a retail company may sell products over different channels such as online e-commerce platforms as well as physical store locations. The retail company may maintain separate customer records for each of its different retail channels.

Records may be maintained in separate database tables. Merging two database tables may be time consuming and costly. The present disclosure describes systems and methods of managing a database that overcomes a number of the drawbacks of prior art solutions. The advantages and benefits of the present disclosure will be discussed in further detail.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIGS. 6 and 7 are examples of a concatenation approach for fusing database tables together executing within the computing system 100 of FIG. 1 according to various embodiments of the present disclosure.

DETAILED DESCRIPTION

Various embodiments of the present disclosure relate to merging two or more database tables together to create a merged database table. Merging database tables can be a time consuming and burdensome process. Techniques such as extract transform load (ETL) are time intensive processes that may require significant user input and human intervention to create a merged database table. This may be the case where there is a likelihood that redundant records exist within the two or more database tables that are being merged.

The present disclosure provides two approaches for effectively fusing together a plurality of database tables. The transitive approach involves processing each database table to deduplicate it. This may involve clustering similar records to conform to a combined database entry for each cluster. In effect, this consolidates redundant records thereby deduplicating each database table. Then a first deduplicated database table is merged with a second deduplicated database table to yield a merged database table. This may involve performing pairwise comparisons between the two deduplicated databases to identify redundant records. Thereafter, a third deduplicated database table may be merged with the previously merged database table using a similar pairwise comparison. This many continue for subsequent iterations of additional deduplicated database tables.

The second approach, referred to as the concatenation approach, involves performing a concatenation operation. In this case, multiple database tables are concatenated to create a concatenated database table. Thereafter, database records within the concatenated database table are subject to pairwise comparisons to find related record pairs. Related record pairs are clustered together to form clusters of records that likely represent the same real-world entity. A merged database table is generated by consolidating the clustered records into combined database entries.

Figure 1:
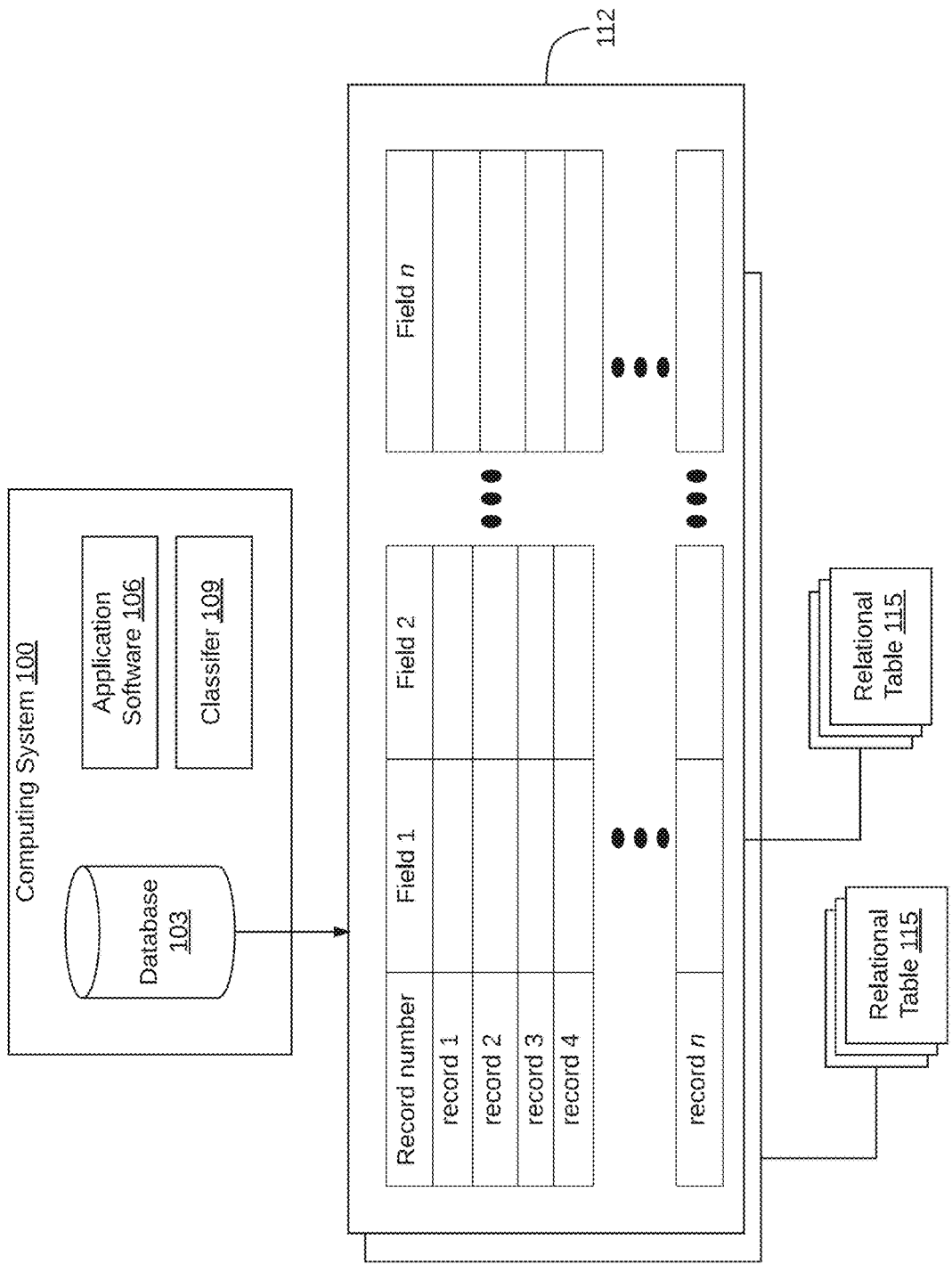
FIG. 1 is a drawing of a computing system 100 according to various embodiments of the present disclosure.

FIG. 1 shows a computing system 100 according to various embodiments. The computing system 100 is made up of a combination of hardware and software. The computing system 100 includes a database 103, a software application 106, and a classifier 109. The computing system 100 may be connected to networks such as the Internet, intranets, extranets, wide area networks (WANs), local area networks (LANs), wired networks, wireless networks, or other suitable networks, etc., or any combination of two or more such networks.

The computing system 100 may comprise, for example, a server computer or any other system providing computing capability. Alternatively, the computing system 100 may employ a plurality of computing devices that may be arranged, for example, in one or more server banks or computer banks or other arrangements. Such computing devices may be located in a single installation or may be distributed among many different geographical locations. For example, the computing system 100 may include a plurality of computing devices that together may comprise a hosted computing resource, a grid computing resource and/or any other distributed computing arrangement. In some cases, the computing system 100 may correspond to an elastic computing resource where the allotted capacity of processing, network, storage, or other computing-related resources may vary over time. The computing system 100 may implement one or more virtual machines that use the resources of the computing system 100.

Various applications and/or other functionality may be executed in the computing system 100 according to various embodiments. Also, various data is stored in the database 103 or other memory that is accessible to the computing system 100. The database 103 may represent one or more databases 103.

The data stored in the database 103 includes one or more database tables 112. A database table 112 includes several records, where each record has one or more corresponding fields. A database table 112 may be linked or otherwise associated with one or more relational tables 115. The components executed on the computing system 100 include a software application 106 and a classifier 109, which may access the contents of the database 103. When stored in a relational database 103, a database table 112 may be linked to one or more relational tables 115. For example, if an airline company maintained a database table 112 that stored customer records, there may be a relational table 115 storing the flight history for each customer. The contents of the relational table 115 links to a corresponding record.

Next, a general description of the operation of the various components of the computing system 100 is provided. Various businesses or other entities utilize the computing system to store information in a database 103. For example, businesses may want to store records reflecting customers, products, transactions, events, items, or any other piece of information relevant to the business. Records are collected over time and stored in one or more database tables 112. For example, when a business gets a new customer, a software program may create a record reflecting the new customer. This record may include the customer's name, address, contact information, or any other information that identifies the customer. Such information is stored as fields within a database table. The values in a field may be used to calculate one or more features between records.

In practice, a single record is sufficient to represent a customer. However, it is possible that duplicate or redundant records are inadvertently or unintentionally created and/or exist within one or more databases 103. For example, a customer may register with a business via an online portal which creates a customer record for that customer. Later, the same customer may inadvertently register again with the online portal, thereby creating a redundant customer record in the database table 112. Also, a company may have a first database table 112 for its brick and mortar customers and a second database table 112 for its e-commerce customers. It is possible that the same customer has a corresponding record in these two different database tables 112. As another example, two businesses maintaining their own customer records may merge such that the same customer may exist in two different database tables 112. The resulting merged database table could have redundant records reflecting the same customer.

Because multiple records may represent the same real-world entity, it is desirable to group related records together. A classifier 109 may be used to determine whether two records should be classified as a match based on the degree of related or common values between the two records. The classifier 109 may be a binary classifier that determines whether a pair of records represent the same real-world entity or whether they do not represent the same real-world entity. A record pair (i.e., two records being compared) is considered to be a related record pair if it represents the same real-world entity or an unrelated pair if it does not. A classifier 109 may make decisions based on a threshold level of similarity. The classifier 109 may calculate a confidence level (e.g., a score) that quantifies the degree of similarity between two records. Then, the classifier 109 may output a binary result (e.g., yes or no) that the two records are similar enough to be deemed a related record pair if the confidence level exceeds a preset threshold confidence level. This preset threshold may be user-specified. The classifier 109 may make its determination based on the extent that two records contain similar information.

When performing a pairwise comparison of records, different combinations of field values among the two records are compared. For example, in one embodiment, the value of F1 of a first record is compared to the value of F1 of a second record, then the value of F2 of the first record is compared to the value of F2 of the second record, and so on. The comparison of two values yields a feature with respect to the record pair. A feature is a programmed calculation taking as inputs M records and/or other data such as external metadata and returning a numeric value as output. The variable M=2 in the case of handling a record pair. That numeric output may be, for example, a real value bounded between 0 and 1, or a binary value with two distinct outputs, 0 being considered "false" and 1 being considered "true." A feature score is the specific output value generated by a feature for a given set of records or record pair. A feature score refers to the degree that two field values are the same.

For example, comparing the first name field value of "Joseph" to the first name field value of "Joe" may yield a "first_name_match" feature having a feature score of 0.88 on a scale of 0 to 1, where 0 means no-match and 1 means a perfect match. In other embodiments the first name feature may be a binary value of "true/T" meaning match or "false/F," meaning no-match. In addition, features may be determined based on a combination of field values. Here, a feature may be "full_name_match," which is a feature based on concatenating a first name field value with a last name field value.

Features are combined to form a feature signature. The feature signature quantifies the extent that a pair of records likely represent the same real-world entity. As an example, a feature signature may be made up features such as "first_name_match," "last_name_match," "full_name_match," "email_address_match," etc. A feature signature is inputted into a classifier 109 to determine if that feature signature reflects a pair of records that are related or unrelated.

Once related record pairs are identified, they are clustered together by applying transitive closure operations on the related record pairs. For example, if Record A and Record B form a related pair and Record B and Record C form a related pair, the clustering operation may group Records A, B, and C together as a cluster.

As discussed in further detail below, the transitive approach applies pairwise comparisons and clustering operations on a plurality of database tables 112 to deduplicate them. This way, the deduplicated database tables have redundant records consolidated. Then, a merged database table is created by performing pairwise operations between two deduplicated database tables. Under the concatenation approach, a plurality of database tables 112 are first concatenated. Then related record pairs are identified and clustered to create a merged database table.

Figure 2:
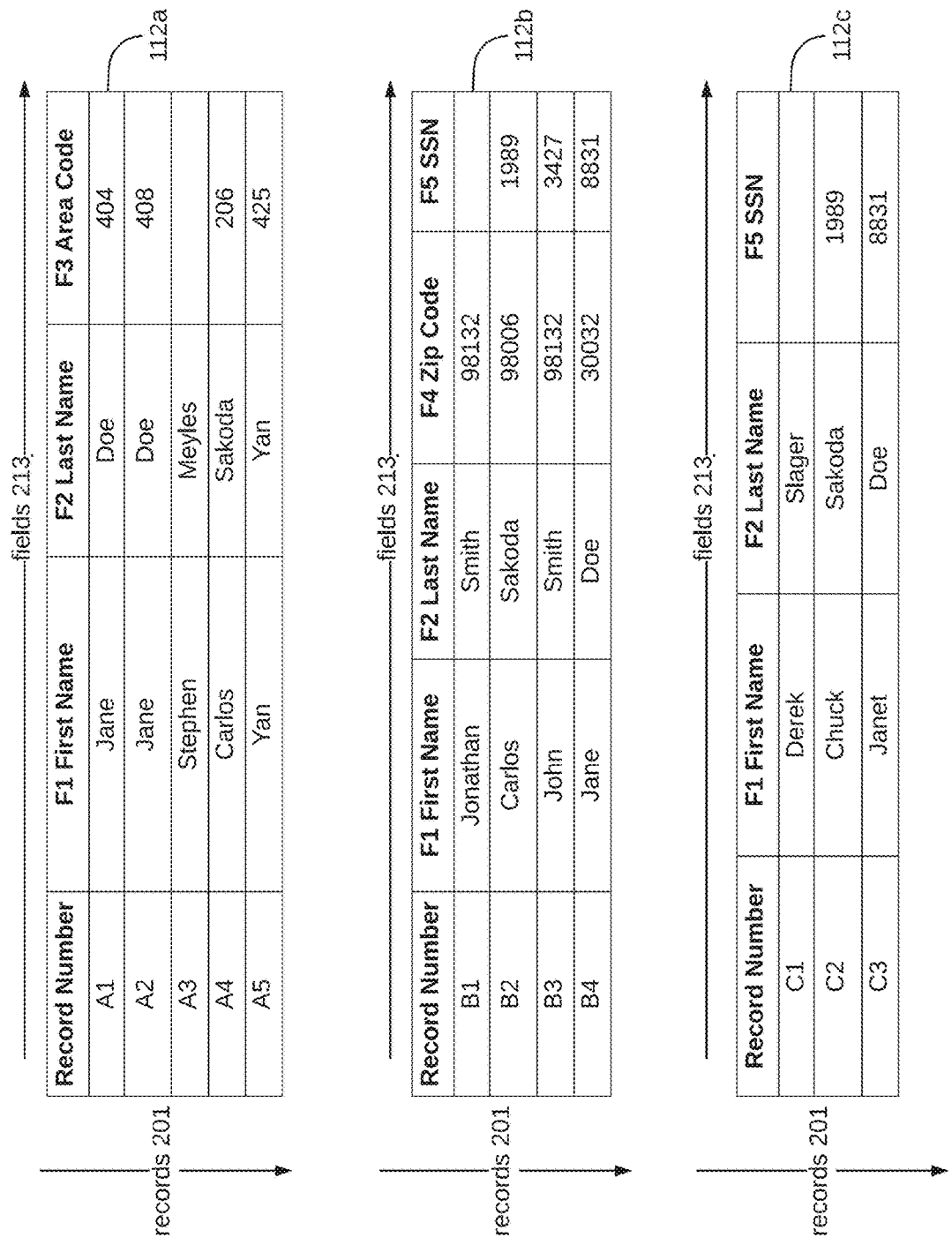
FIG. 2 is an example of database tables 112 of FIG. 1 according to various embodiments of the present disclosure.

FIG. 2 shows an example of three database tables 112*a-c* of FIG. 1, according to various embodiments of the present disclosure. A database table includes one or more records 201, where each record has one or more fields 213. A record 201 may or may not have all its fields 213 populated. Each record 201 is intended to be dedicated to a real-world entity.

For example, record A1 represents an individual named "Jane Doe" and record A2 represents an individual named "Jane Doe." Records A1 and A2 contain different information. For example, in the field F3 "Area Code," a different value appears when comparing record A1 with A2. It is possible that records A1 and A2 represent the same real-world entity, which is an individual named Jane Doe. It is also possible that records A1 and A2 represent different individuals even though some of the field values are common.

Record B4 is another record representing an individual named "Jane Doe." However, Record B4 is in a second database table 112b while records A1 and A2 are in a first database table 112a. Record B4 may or may not represent the same individual represented by records A1 and/or A2. This demonstrates that the same entity, such as a person named "Jane Doe," may have multiple records that are redundantly stored in one or more database tables 112.

In various embodiments, the fields 213 are semantic fields such that they are normalized across a several database tables 112. For example, one database table 112 may have its F2 field originally called "last_name" while a different database table 112 may have its F2 field originally called "surname." By using semantic fields, various database tables 112 conform to a universal format of identifying its fields. This way, the software application 106 (FIG. 1) understands that the "last_name" field of one database table 112 maps to the "surname" field of a different database table 112. The database 103 (FIG. 1) may store a lookup table that maps original fields to semantic fields in order to normalize the fields across multiple database tables 112. As discussed in further detail below, two or more database tables 112a-c are merged in a manner that consolidates records that are likely to be redundant.

Figure 3:
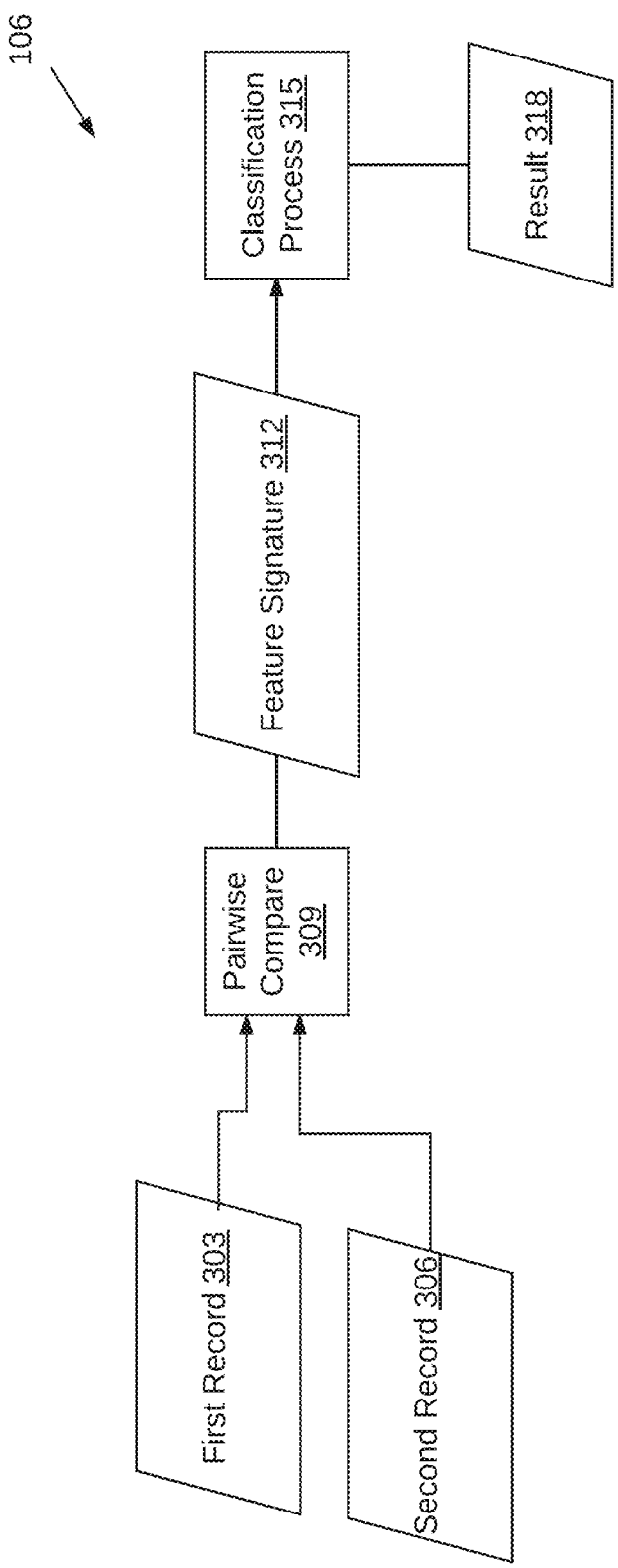
FIG. 3 is an example of operations performed by the software application 106 executing within the computing system 100 of FIG. 1 according to various embodiments of the present disclosure.

FIG. 3 shows an example of operations performed by the software application 106 executing within the computing system 100 of FIG. 1 according to various embodiments of the present disclosure. The software application 106 is configured to select a pair of records and determine whether the record pair is a related record pair or an unrelated record pair. The software application 106 begins by selecting a first record 303 and second record 306 for a pairwise comparison 309. The first record 303 and second record 306 may be selected from the same database table 112 (FIG. 1) or from two different database tables 112. Next, the software application performs a pairwise comparison 309. This may involve comparing the field values between the two records 303 and 306 to determine a feature for a particular field or set of fields. The pairwise comparison 309 generates a feature signature 312 which may be made up of various features of the fields' values being compared.

The feature signature 312 reflects how two records are similar or dissimilar based on the extent the field values are similar. In other words, the feature signature 312 corresponds to a series of features between a pair of records being compared. Two different record pairs may have the same feature signature 312 even though they represent different entities. In this case, it is inferred that the records in the first pair relate to each other in the same way that two records in a second pair relate to each other. For example, given the trivial set of binary features "Fuzzy Last Name match" and "Fuzzy First Name match," the record pair {"Stephen Meyles", "Steve Myles"} will generate a feature signature of [1 1], where "1" refers to a binary value indicating a match. In addition, a record pair of {"Derek Slager", "Derke Slagr"} will also generate a feature signature 312 of [1 1]. This does not necessarily mean that the first pair of records are related to the same real-world identity as the second pair of records. Instead it suggests that the records have the same data variations (fuzzy matches of first and last name). Records with the same data variations may have the same signature.

After generating the feature signature 312, the software application 106 uses a classifier 109 (FIG. 1) to perform a classification process 315 on the feature signature 312. The classification process calculates a classification score that correlates to the strength that a particular feature signature indicates a match. For example, a score of 0 means no-match while a score of 1 means a perfect match. After calculating a classification score, the classifier 109 compares the classification score to a preset threshold score to yield a decision 318 that classifies the feature signature 312. According to various embodiments, the decision 318 is a binary value that indicates if the feature signature 312 reflects a match or no match. A pair that is classified as a match is deemed a related pair while a pair that is classified as a no-match is deemed an unrelated pair. The process shown in FIG. 3 may be applied to various pairwise combinations of records in one or more database tables 112 in order to determine which record pairs are related.

Figure 4A:
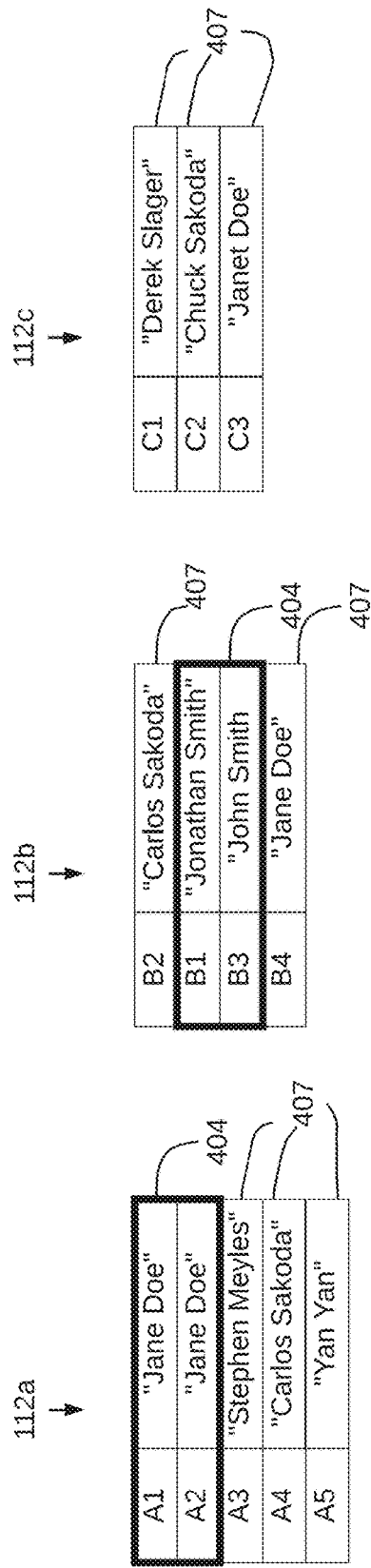
FIGS. 4A-C are examples showing a transitive approach for fusing database tables together executing within the computing system 100 of FIG. 1 according to various embodiments of the present disclosure.
Figure 4B:
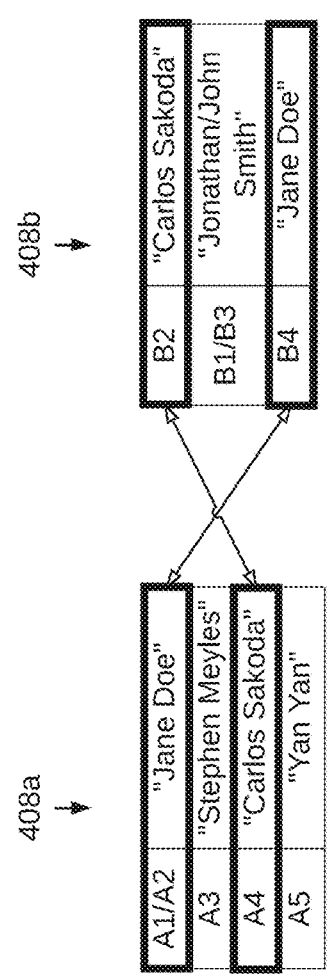
Figure 4C:
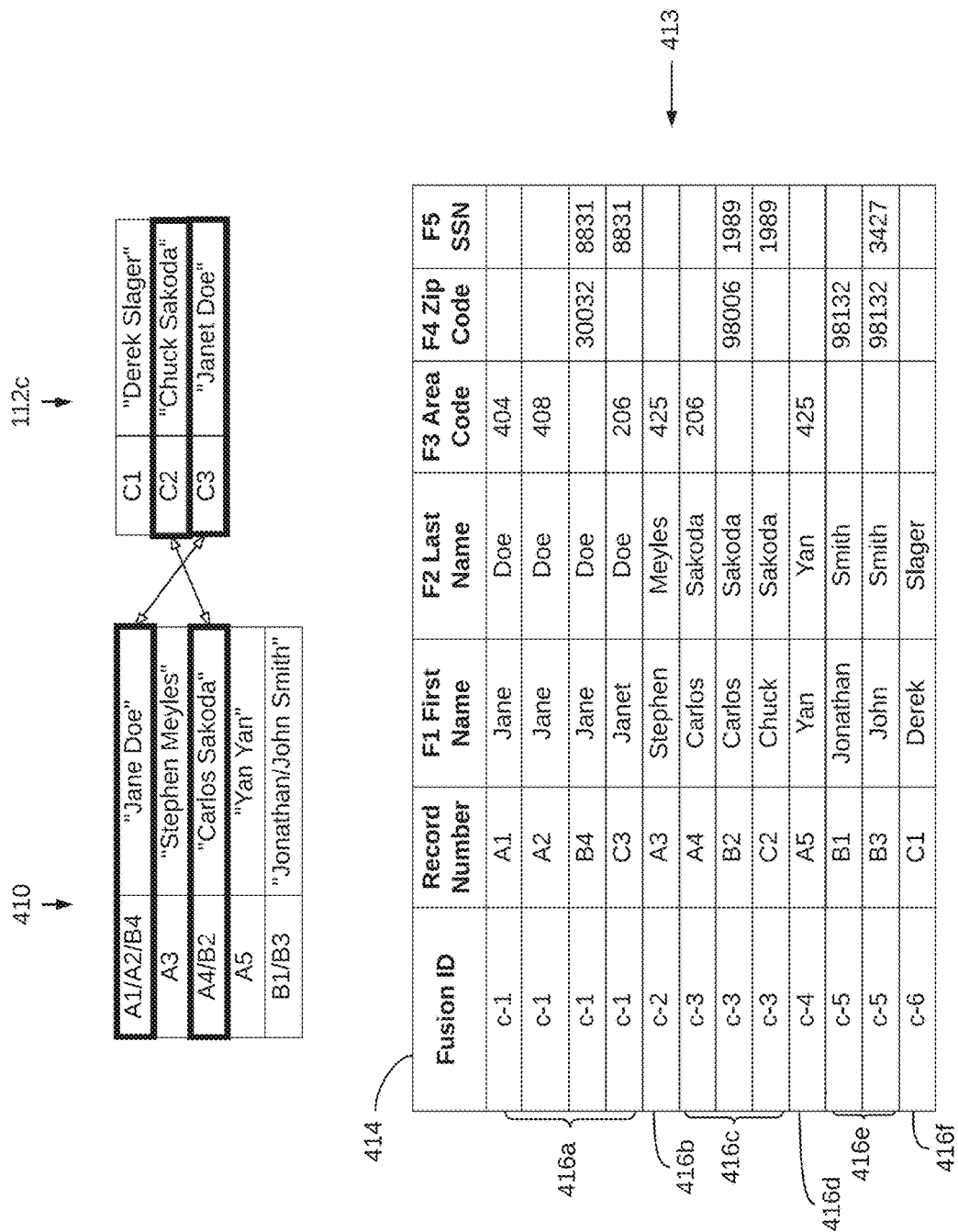

FIGS. 4A-C are examples showing the transitive approach for fusing database tables together executing within the computing system 100 of FIG. 1 according to various embodiments of the present disclosure. As shown in FIG. 4A, to merge two or more database tables 112a-c, the software application 106 begins by deduplicating at least a first database table 112a and a second database table 112b. To deduplicate a database table 112, the software application performs pairwise comparisons on records within a database table to identify related pairs. The software application 106 would perform pairwise comparisons 309 on different record pair combinations made up of a first record 303 (FIG. 3) and second record 306 (FIG. 3) within the same database table 112. Record A1 could be the first record 303 that is compared to any other record (a second record 306) within the first database table 112a. FIG. 4A shows that after performing a number of pairwise comparisons 309, records A1 and A2 are identified as related pairs 404 while records A3, A4, and A5 are unrelated records 407. FIG. 4A also shows how records B1 and B3 of a second database table 112b form a related pair while records B2 and B4 are unrelated records.

The software application 106 may also cluster related pairs 404 using a transitive closure operation. Here if there are multiple related pairs 404 representing the entity, those pairs may be clustered together. For example, if record A and record B form a related pair and record B and record C form a related pair, the clustering operation may group records A, B, and C together as a cluster. If record A and record B are not similar to any other related pair, then the related pair of record A and record B form their own cluster.

FIG. 4B shows a first deduplicated database table 408a and a second deduplicated database table 408b. The deduplicated database table 408a is generated by consolidating each cluster of records that represent the same entity. For example, as discussed in FIG. 4A, records A1 and A2 form a related pair 404. These records would be clustered together so that they are consolidated into a combined database entry. This combined entry would be created by combining one or more field values of the records within a cluster so that the combined entry is handled as a single database entry.

Similarly, the second deduplicated database table 408b is generated from the second database table 112b by merging clusters of related records into a combined database entry. As shown in FIG. 4B, records B1 and B3 have been consolidated because both records form a related pair 404.

Records B2 and B4 remain unconsolidated because they are unrelated records 407 that do not relate to any other records within the second database table 112b.

FIGS. 4B and 4C show how the first deduplicated database table 408a is merged with a second deduplicated database table 408b to create a merged database table 410. Through the clustering operations, a deduplicated database table 408 redundant records are consolidated. When merging two deduplicated database tables 408, the software application 106 performs pairwise comparisons 309 using a first record 303 from the first deduplicated database table 408a and a second record 306 from the second deduplicated database table 408b. Moreover, a cluster of records consolidated into a combined entry is treated as a single record when performing the pairwise comparisons.

FIG. 4B shows how the combination of records A1 and A2 form a first record 303 that is compared against the various records in the second deduplicated database table 408b to determine if records A1 and A2 are related to any records in the second deduplicated database table 408b. As shown in FIG. 4B, these pairwise comparisons 309 result in establishing that records A1 and A2 form a related pair with respect to record B4. Accordingly, records A1, A2, and B4 are consolidated into a combined database entry of the merged database table 410. FIG. 4B also shows that record A4 and record B2 form a related record pair. These two records are consolidated into a combined entry in the merged database table 410.

Record A3 of the first deduplicated database table 408a may serve as a first record 303 that is compared against different records in the second deduplicated database table 408b, each of which serve as a second record 306. The result 318 in this example shows that record A3 is an unrelated record 407 with respect to the records in the second deduplicated database table 408b.

Once a merged database table 410 is generated, other database tables, such as a third database table 112c may be deduplicated and then compared to the merged database table 410 to generate an updated merged database table 413.

The updated merged database table 413 may include fusion IDs 414 which are identifiers that represent clusters of records 416a-f. FIG. 4C shows how a given cluster 416 has been consolidated into a combined database entry using a fusion ID 414 that links the records together. In this respect, the fusion ID 414 allows the records in a cluster 416 to be handled together for subsequent database operations.

The third database table 112c, in this example does not include any related pairs, therefore, the third database table can be deduplicated no further. When comparing the third database table 112c to the merged database table 410, the example shows how records A1, A2, and B4 are consolidated to form a first record 303 that is related to record C3 of the third database table 112c, which is a second record 306. Accordingly, records A1, A2, B4, and C3 are consolidated as a combined entry in the updated merged database table 413. They form a cluster of records 416a that has a fusion ID of "c-1." Similarly, records A4 and B2 of the merged database table 410 relate to record C2 and thereby form a combined entry in the updated merged database table 413 having a fusion ID 414 of "c-3." Records B1 and B3 form a combined entry using the fusion ID "c-5." Records A3, A5, and C1 are unrelated records that for their own respective clusters 416b, 416d, and 416f and have their own respective fusion IDs "c-2," "c-4," and "c-6."

The updated merged database table 413 becomes the latest version of the merged database table 410 going forward. Specifically, as the need to merge new database tables 112 continues, the new database tables 112 are deduplicated and then compared to the latest merged database table 413 to update the merged database table 410.

Figure 5:
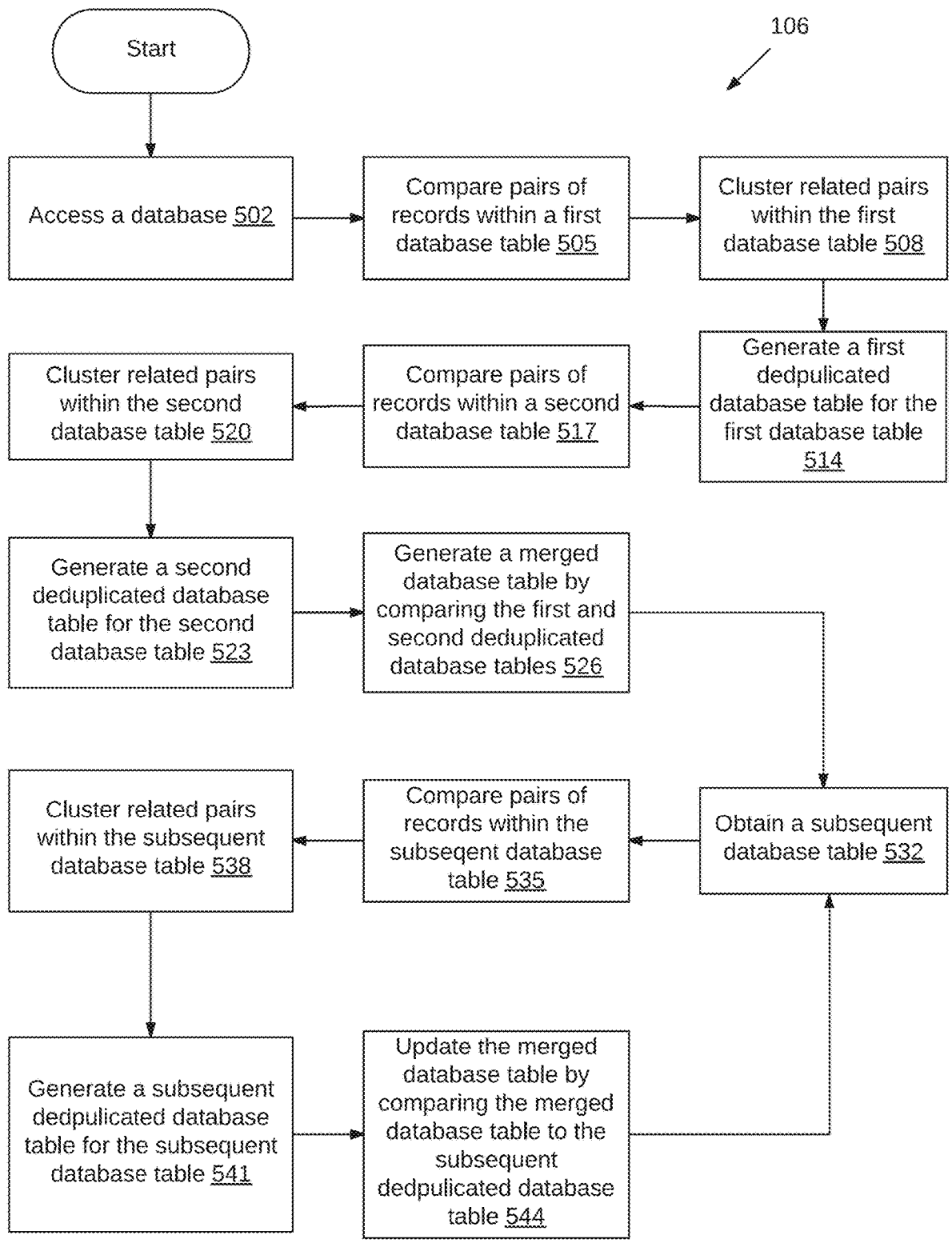
FIG. 5 is a flowchart illustrating an example of the functionality of the software application executed in a computing system 100 of FIG. 1 performing the transitive approach according to various embodiments of the present disclosure.

FIG. 5 is a flowchart that provides an example of the operation of the software application 106 performing the transitive approach to merging database tables 112 (FIG. 1) according to various embodiments. It is understood that the flowchart of FIG. 5 provides merely an example of the many different types of functional arrangements that may be employed to implement the operation of the portion of the software application as described herein. As an alternative, the flowchart of FIG. 5 may be viewed as depicting an example of elements of a method implemented in the computing system 100 (FIG. 1) according to one or more embodiments.

The software application 106 begins by accessing a database 502. Two or more database tables are selected to be merged together using a transitive approach. The software application 106 deduplicates a first database table 112a and deduplicates a second database table 112b. To accomplish this, the software application 106 compares pairs of records within the first database table 112a, as shown at 505. Here, different combinations of records are selected as the first record 303 (FIG. 3) and second record 306 (FIG. 3) within the same database table 112. This pair of records is subject to a pairwise comparison 309 (FIG. 3) where different field values are compared to identify features. A feature may check for whether a particular field matches or a particular combination of fields match between the first record 303 and second record 306. A binary value, such as true/false, or a non-binary value, such as a match score, may be calculated for each feature. This generates a feature signature 312 (FIG. 3) that is made up of a set of features for a given pair of records. The feature signature for a record pair is classified by a classifier 109 (FIG. 1) to generate a result 318 (FIG. 3) which may be a binary value indicating a match or no-match. By performing various pairwise comparisons for records within a database table 112, the software application 106 separates out related pairs 404 (FIGS. 4A-4C) from unrelated records 407 (FIGS. 4A-4C).

At 508, the software application 106 clusters related pairs 404 within the first database table. Here, if two related pairs are sufficiently similar to each other, the record pairs will be clustered together and treated as if the cluster represents the same entity. For example, the software application 106 performs a transitive closure operation to cluster together related pairs 404 that likely relate to the same entity. If records A and B form a related pair such that they both are deemed to represent an individual named "John Doe" and records B and C also form a related pair such that they both are deemed to represent an individual named "John Doe," then records A, B, and C may be clustered together as records that represent the same individual.

At 514, the software application 106 generates a first deduplicated database table 408a (FIG. 4B) for the first database table 112a. Here, clusters of records that represent the same entity are consolidated into a combined database entry. This results in a deduplicated database table 408 that is optimized by reducing the likelihood of containing redundant records.

At 517, 520, and 523, the software application deduplicates a second database table 112a using a similar process described above with respect to 505, 508, and 514. At 517, the software application 106 compares pairs of records within a second database table 112b. At 520, the software application 106 clusters the related pairs 404 within the second database table 112a. And, at 523, the software application generates a second deduplicated database table 408b (FIG. 4B) for the second database table 112b.

Once at least two database tables 112 have been deduplicated by consolidating related pairs 404, the software application 106 at 526 generates a merged database table 410 (FIG. 4C) by comparing the first and second deduplicated database tables 408. Here records from the first deduplicated database table 408a serve as a first record 303 in a pairwise comparison 309 while records from the second deduplicated database table 408b serve as a first record 306 in the pairwise comparison 309. To this end, the software application identifies if any records between the first and second deduplicated database tables 408 form related pairs 404 so that they should be consolidated into the merged database table 410.

Having merged two database tables 112, the software application 106 waits until it obtains a subsequent database table at 532. The subsequent database table may be a third database table 112c or any additional database table 112. Thereafter, at 535, 538, and 541, the software application deduplicates the subsequent database table 112c. Specifically, at 535, the software application 106 compares pairs of records within the subsequent database table 112c. At 538, the software application 106 clusters the related pairs 404 within the subsequent database table 112c. And, at 541, the software application 106 generates a subsequent deduplicated database table 408 for the subsequent database table 112c.

At 544, the software application updates the merged database table 410 by comparing the merged database table 410 to the subsequent deduplicated database table 408. This process generates an updated merged database table 413 (FIG. 4C). The software application 106 continues to wait for subsequent database tables 112 so that they can be deduplicated and merged with the most recent merged database table 413.

FIG. 6 provides an example of the concatenation approach for fusing database tables 112 together executing within the computing system 100 of FIG. 1 according to various embodiments of the present disclosure. Specifically, FIG. 6 shows a concatenated database table 605 which includes concatenated records 608 and concatenated fields 613. To generate the concatenated database table 605, the software application 106 (FIG. 1) concatenates the records taken from a plurality of database tables 112a-c (FIG. 2). Building on the example in FIG. 2, the first database table 112a includes records A1-A5, while the second database table 112b includes records B1-B3, and the third database table 112c includes records C1-C3. The combination of these records forms the concatenated records 608 within the concatenated database table 605.

Prior to creating the concatenated database table 605, the original records 201 (FIG. 2) originally had their own fields 213 (FIG. 2). Some of these fields 213 overlapped across different database tables 112 while some did not. For example, originally the first database table 112a has fields F1, F2, and F3. The second database table 112b also has fields F1 and F2 but not F3. The second database table 112b has fields F4 and F5, unlike the first database table 112a. When generating the concatenated database table 605, all fields across the database tables 112 being merged are concatenated so that the concatenated database table 605 includes concatenated fields 613.

Null values may be used for concatenated records 608 that do not have field values. For example, because the first database table 112a has no field F4 and F5, null values are used for these concatenated records.

Figure 7:
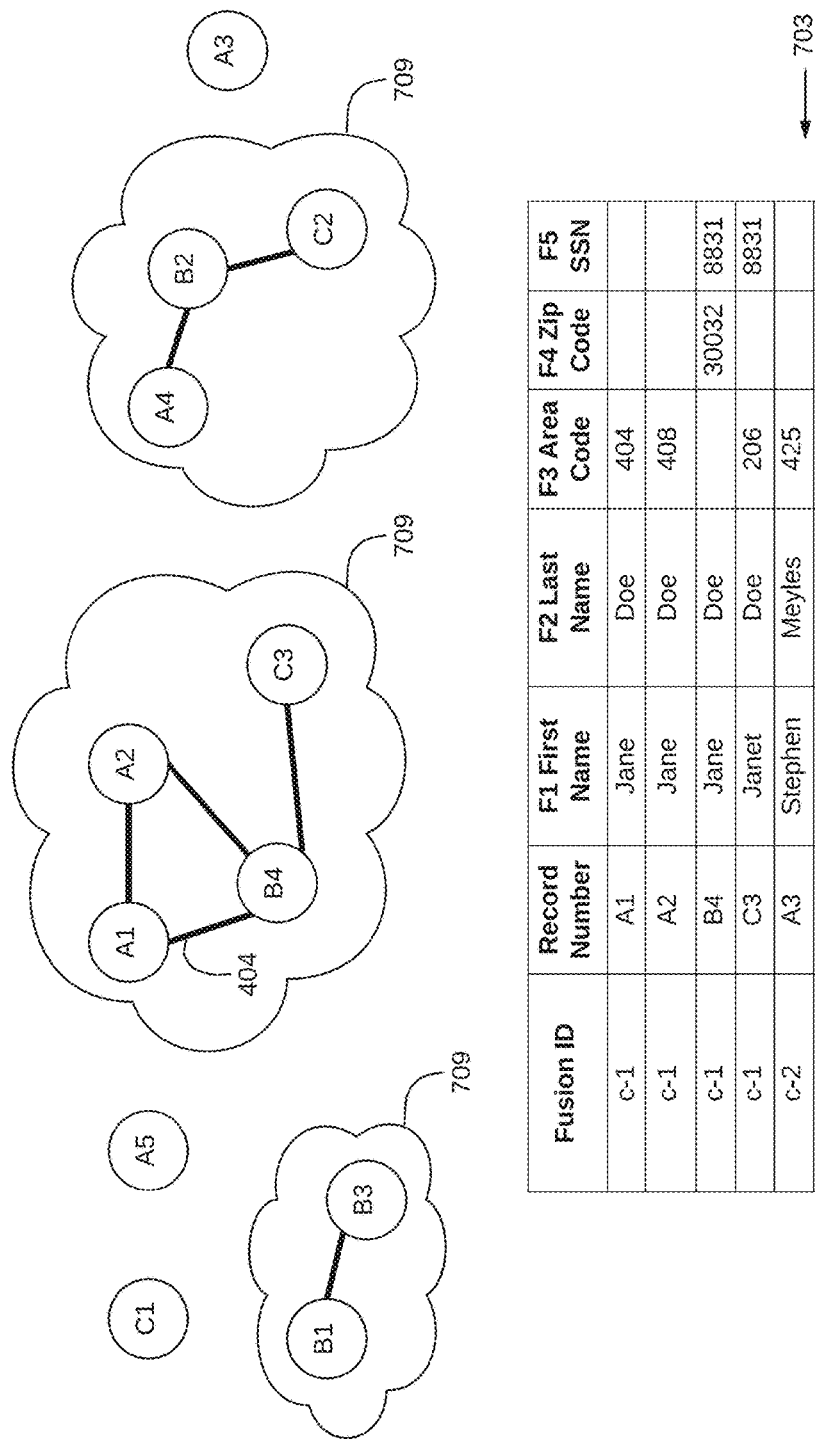

FIG. 7 builds on the example of FIG. 6 by showing the concatenation approach for fusing database tables together executing within the computing system 100 of FIG. 1 according to various embodiments of the present disclosure. FIG. 7 demonstrates an example of how the software application 106 creates a merged database table 703 by processing the concatenated database table 605 (FIG. 6). The software application 106 operates on the concatenated database table 605 by identifying related record pairs 404 within the concatenated database table 605. Once record pairs are identified, similar record pairs are clustered to identify clusters 709. These clusters 709 are used to create a merged database table 703 where each cluster 709 is consolidated into a combined database entry. To this end, the concatenated database table 605 is deduplicated to generate the merged database table 703. The merged database table 703 of FIG. 7 may be formatted in a manner depicted in FIG. 4C such that the merged database table 703 includes fusion IDs 414 (FIG. 4C) for each cluster 709.

The example of FIG. 7 shows different records A1-A5, B1-B4, and C1-C3, where each record is depicted as a circle. These records exist within the concatenated database table 605. FIG. 7 also shows related pairs 404 by depicting a black line connecting two related records within the record pair. The lack of a black line between two records shows that those two records are unrelated. Some records, such as C1, A3, and A5 are not part of any record pair 404, thus there are not connected to any other records. A related pair may be expressed using the syntax "[first record-second record]" to show a related record pair. Of course, [first record-second record] is the same as [second record-first record]. The software application 106 identified related pairs 404 such as [A1-A2], [A1-B4], [B4-A2], [B4-C3], [B1-B3], [A4-B2], and [B2-C2], which is depicted using a solid line to connect the records.

As discussed above, a classifier 109 (FIG. 1) determines a confidence level when comparing two records. The confidence level corresponds to a degree of strength that the two records are likely to represent the same real-world entity. When a record pair's confidence level exceeds a preset threshold amount, the record pair is deemed to be a related pair 404.

Once related pairs are identified, the software application 106 performs a clustering function to group related pairs into corresponding clusters 709. This is shown by a bubble surrounding a group of records. For example, the software application 106 uses transitive closure operations to determine that two or more related pairs should be grouped into a cluster 709. In the example of FIG. 7, record pairs 404 [A1-A2], [A1-B4], [B4-A2], [B4-C3] form a cluster 709. Although record C3 does not form a related pair with respect to record A2 or A1, it is still included in the same cluster 709 for at least the reason that it forms a related pair with respect to record B4. When clustering related pairs 404, the software application 106 may account for the confidence score of various related records to determine whether a particular record should be included or excluded in a cluster 709. For example, if record C3 has a high enough confidence score with respect to record B4 but a relatively low confidence score when compared to records A1 and A2, record C3 could be excluded from the cluster 709. It should also be noted that a single, unrelated record such as record C1 forms its own cluster.

Once the clusters 709 are determined, the software application 106 consolidates the records of a cluster 709 into a combined database entry of the merged database table 703. Single records that are part of their own cluster, such as records A3, A5, and C1, each have their own database entry in the merged database table 703.

Figure 8:
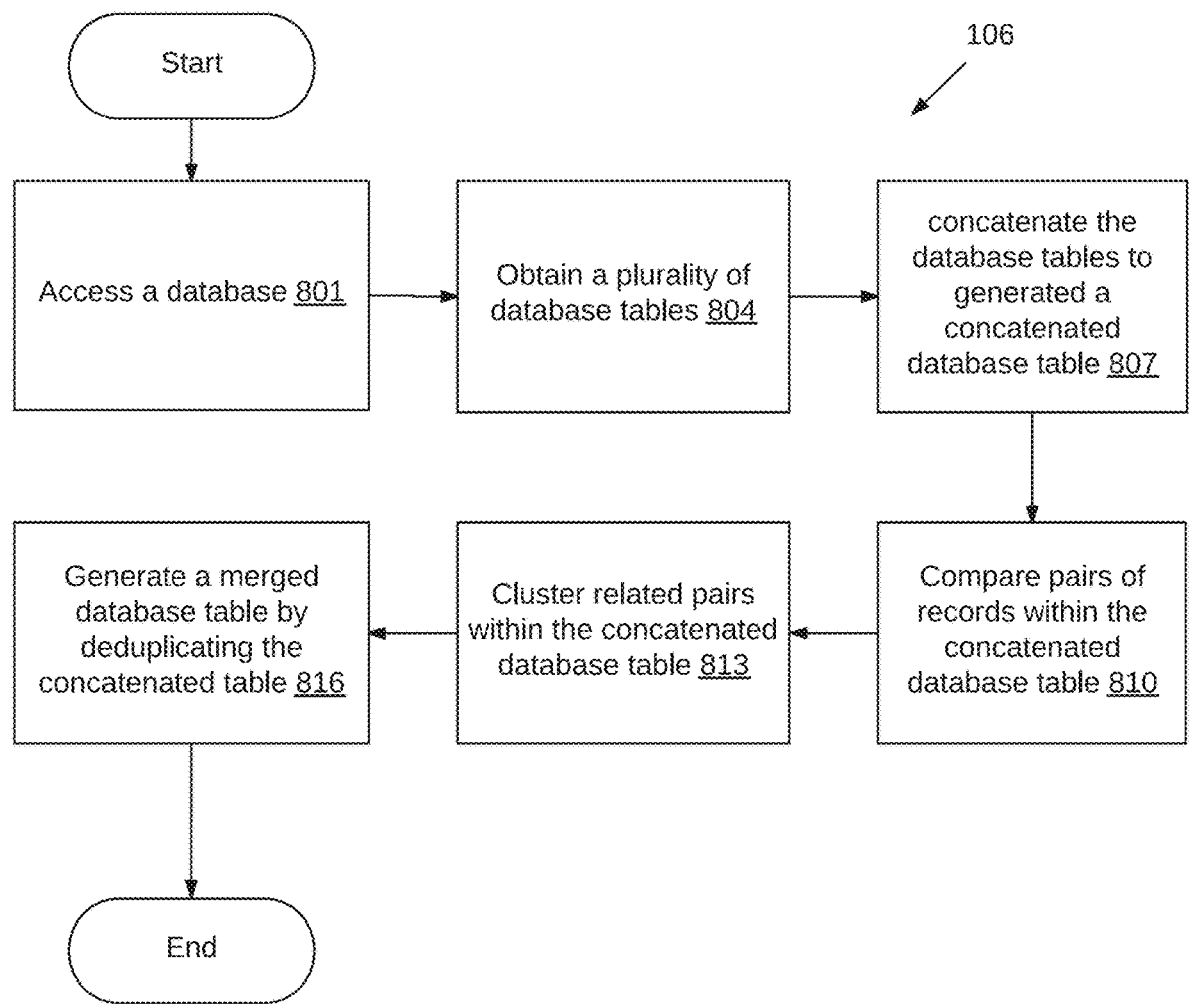
FIG. 8 is a flowchart illustrating an example of the functionality of the software application executed in a computing system 100 of FIG. 1 performing the concatenation approach according to various embodiments of the present disclosure.

FIG. 8 is a flowchart that provides an example of the operation of the software application 106 performing the concatenation approach to merging database tables 112 (FIG. 1) according to various embodiments. It is understood that the flowchart of FIG. 8 provides merely an example of the many different types of functional arrangements that may be employed to implement the operation of the portion of the software application 106 as described herein. As an alternative, the flowchart of FIG. 8 may be viewed as depicting an example of elements of a method implemented in the computing system 100 (FIG. 1) according to one or more embodiments.

The software application 106 begins by accessing a database 801. Two or more database tables 112 are selected to be merged together using the concatenation approach. At 804, the software application 106 obtains a plurality of database tables 112. The example of the present disclosure uses the first database table 112a, the second database table 112b, and the database table 112c, for illustrative purposes.

At 807, the software application 106 concatenates the database tables 112 to generate a concatenated database table 605. This is discussed with respect to FIG. 6. To reiterate, the various records among the plurality of database tables 112 are concatenated along with their respective fields. At 810, the software application 106 compares pairs of records within the concatenated database table 605. Specifically, the software application 106 identifies related pairs 404 within the set of concatenated records 608 (FIG. 6).

At 813, the software application 106 clusters the related pairs within the concatenated database table 605. Unrelated records are treated as being within their own cluster 709 (FIG. 7). A single related pair 404 that is unrelated to any other related pair 404 is treated as having its own cluster 709. And two or more related pairs 404 that relate to the same real-world entity are placed within their own cluster 709.

At 816, the software application 106 generates a merged database table 703 by deduplicating the concatenated table 805. The software application 106 creates the merged database table 703 by consolidating a cluster 709 into its own database entry to reduce the occurrence of redundant records.

Figure 9:
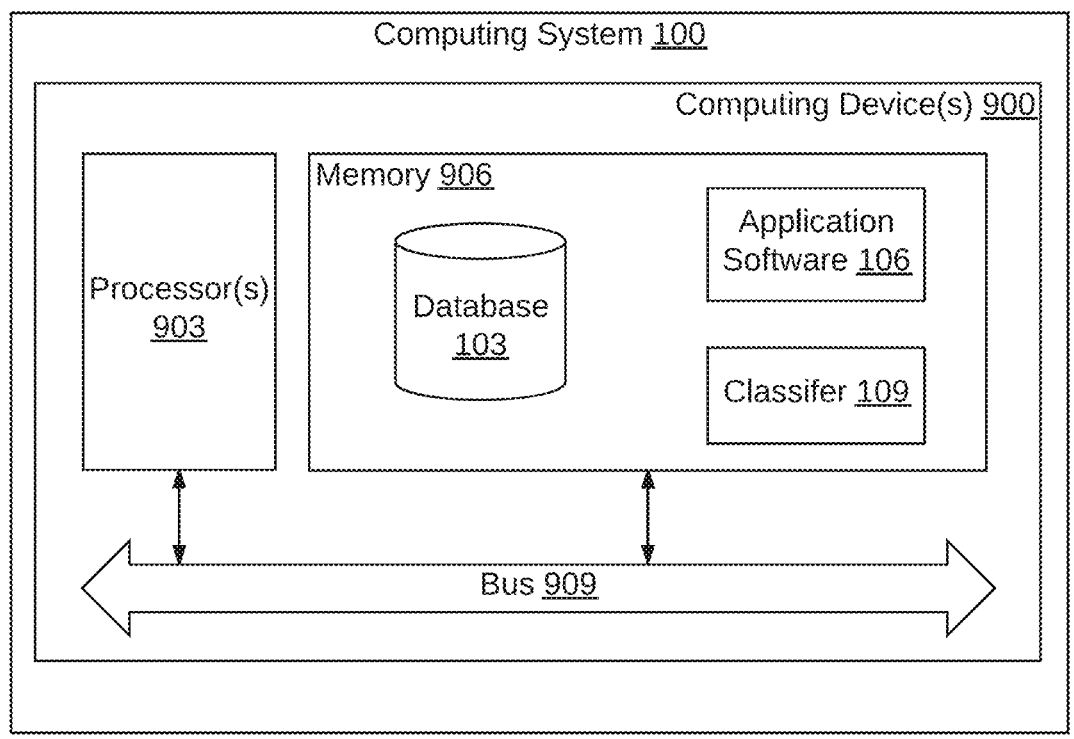
FIG. 9 is a schematic block diagram that provides one example illustration of a computing system 100 of FIG. 1 according to various embodiments of the present disclosure.

FIG. 9 shows a schematic block diagram of the computing system 100 according to an embodiment of the present disclosure. The computing system 100 includes one or more computing devices 900. Each computing device 900 includes at least one processor circuit, for example, having a processor 903 and memory 906, both of which are coupled to a local interface 909 or bus. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the software application 106 and classifier 109. Also stored in the memory 906 may be a database 103 and other data such as, for example a merged database table 410 and 703. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

Several software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static RAM (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the software application 106 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 8 show the functionality and operation of an implementation of the software application 106. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 903 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession in FIGS. 5 and 8 may be executed concurrently or with partial concurrence. Further, in some embodiments, one or more of the boxes shown in FIGS. 5 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application 106 may also comprise software or code that can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static RAM (SRAM) and dynamic RAM (DRAM), or magnetic RAM (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 106, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 900, or in multiple computing devices in the same computing system 100. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method comprising:
    de-duplicating a first database table and a second database table to generate a first de-duplicated database table and a second de-duplicated database table, the de-duplicating for a respective database table comprising:
        performing pairwise comparisons on the respective database table to determine related pairs of records stored in the respective database table having a degree of similarity that exceeds a preset threshold,
        identifying clusters based on the pairwise comparisons, and
        consolidating redundant records in the respective database table using the clusters to generate a respective deduplicated database table;
    performing third pairwise comparisons by comparing the first de-duplicated database table and second de-duplicated database table; and
    generating a merged database table based on the third pairwise comparisons.

2. The method of claim 1, wherein identifying clusters based on the pairwise comparisons comprises merging two records in the respective database table.

3. The method of claim 2, wherein merging two records in the respective database table comprises merging record identifiers of the two records.

4. The method of claim 1, wherein comparing the first de-duplicated database table and second de-duplicated database table comprises comparing a record from the first de-duplicated database table to a record in the second de-duplicated database table.

5. The method of claim 1, wherein generating a merged database table comprises generating a new database table, the new database table including fields present in the first database table and fields present in the second database table.

6. The method of claim 5, wherein generating a merged database table further comprises adding a fusion identifier field to the merged database table, the fusion identifier identifying an identified cluster of records.

7. The method of claim 6, wherein each record in the first database table and second database table is present in the merged database table.

8. The method of claim 6, further comprising receiving an operation affecting a row in the merged database table and performing the operation on all records associated with a fusion identifier associated with the row.

9. A non-transitory computer-readable storage medium for storing instructions capable of being executed by a processor, the instructions defining the steps of:
    de-duplicating a first database table and a second database table to generate a first de-duplicated database table and a second de-duplicated database table, the de-duplicating for a respective database table comprising:
        performing pairwise comparisons on the respective database table to determine related pairs of records stored in the respective database table having a degree of similarity that exceeds a preset threshold,
        identifying clusters based on the pairwise comparisons, and
        consolidating redundant records in the respective database table using the clusters to generate a respective deduplicated database table;
    performing third pairwise comparisons by comparing the first de-duplicated database table and second de-duplicated database table; and
    generating a merged database table based on the third pairwise comparisons.

10. The non-transitory computer-readable storage medium of claim 9, wherein identifying clusters based on the pairwise comparisons comprises merging two records in the respective database table.

11. The non-transitory computer-readable storage medium of claim 10, wherein merging two records in the respective database table comprises merging record identifiers of the two records.

12. The non-transitory computer-readable storage medium of claim 9, wherein comparing the first de-duplicated database table and second de-duplicated database table comprises comparing a record from the first de-duplicated database table to a record in the second de-duplicated database table.

13. The non-transitory computer-readable storage medium of claim 9, wherein generating a merged database table comprises generating a new database table, the new database table including fields present in the first database table and fields present in the second database table.

14. The non-transitory computer-readable storage medium of claim 13, wherein generating a merged database table further comprises adding a fusion identifier field to the merged database table, the fusion identifier identifying an identified cluster of records.

15. The non-transitory computer-readable storage medium of claim 14, wherein each record in the first database table and second database table is present in the merged database table.

16. The non-transitory computer-readable storage medium of claim 14, further comprising receiving an operation affecting a row in the merged database table and performing the operation on all records associated with a fusion identifier associated with the row.

17. A device comprising:
    a processor configured to:
        de-duplicate a first database table and a second database table to generate a first de-duplicated database table and a second de-duplicated database table, the de-duplicating for a respective database table comprising:
            performing pairwise comparisons on the respective database table to determine related pairs of records stored in the respective database table having a degree of similarity that exceeds a preset threshold,
            identifying clusters based on the pairwise comparisons, and
            consolidating redundant records in the respective database table using the clusters to generate a respective deduplicated database table;
        perform third pairwise comparisons by comparing the first de-duplicated database table and second de-duplicated database table; and
        generate a merged database table based on the third pairwise comparisons.

18. The device of claim 17, wherein generating a merged database table comprises generating a new database table, the new database table including fields present in the first database table and fields present in the second database table.

19. The device of claim 18, wherein generating a merged database table further comprises adding a fusion identifier field to the merged database table, the fusion identifier identifying an identified cluster of records.

20. The device of claim 19, further comprising receiving an operation affecting a row in the merged database table and performing the operation on all records associated with a fusion identifier associated with the row.

* * * * *